May 25, 1965 A. C. HOWELL, JR 3,184,795
CONTINUOUS COIL WINDING APPARATUS
Filed April 20, 1962 4 Sheets-Sheet 1
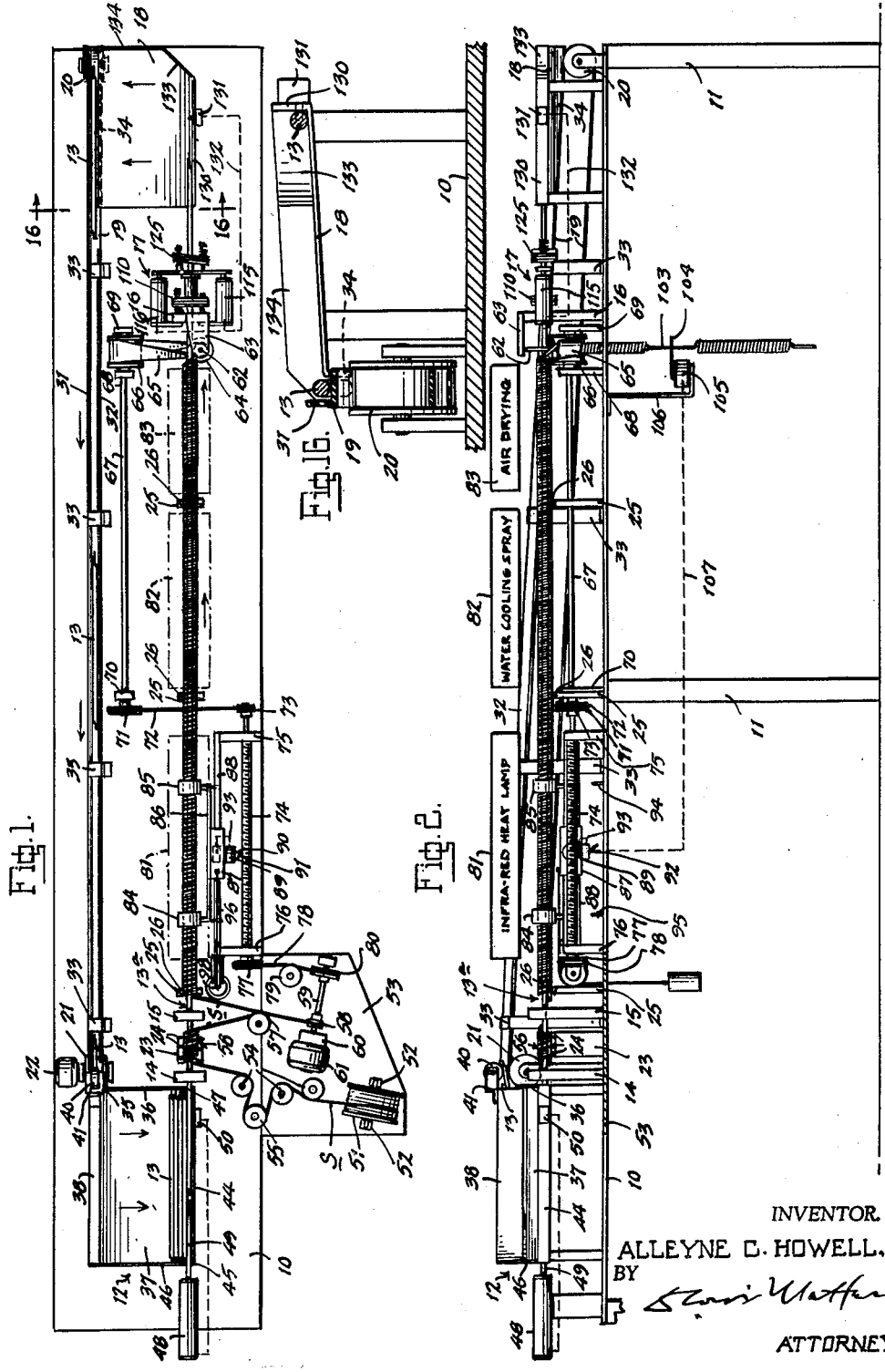
INVENTOR.
ALLEYNE C. HOWELL, JR.
BY
ATTORNEY.

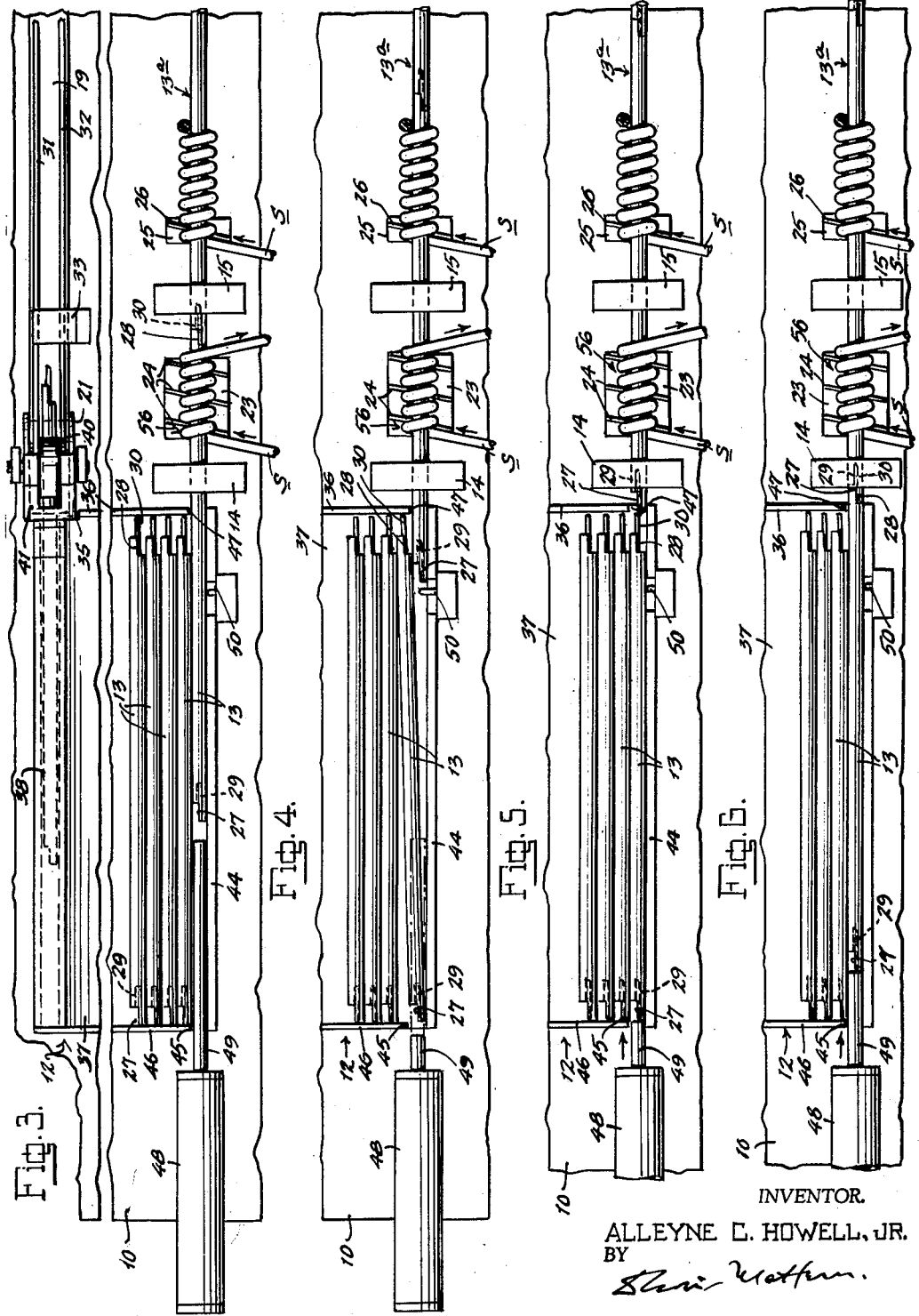

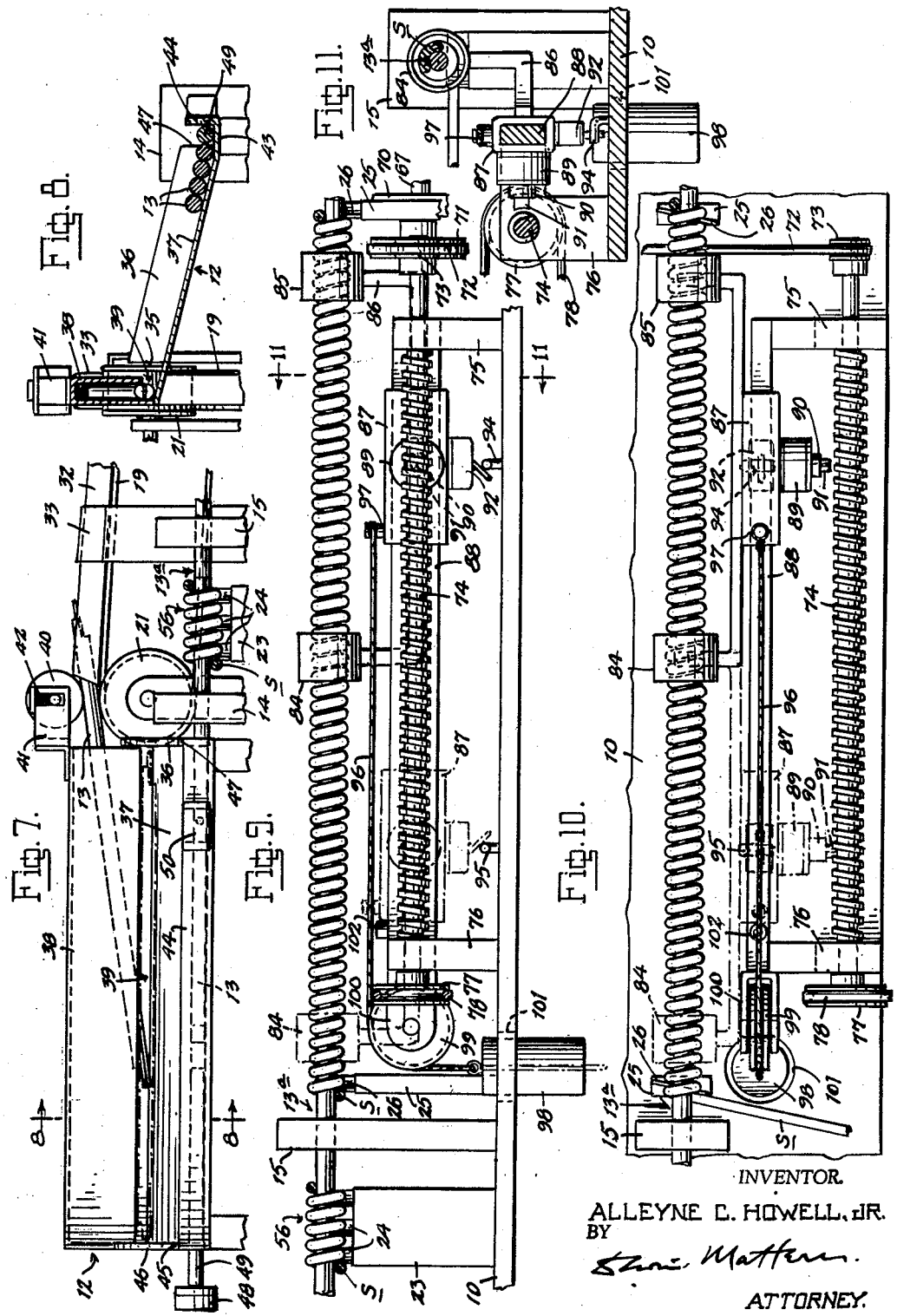

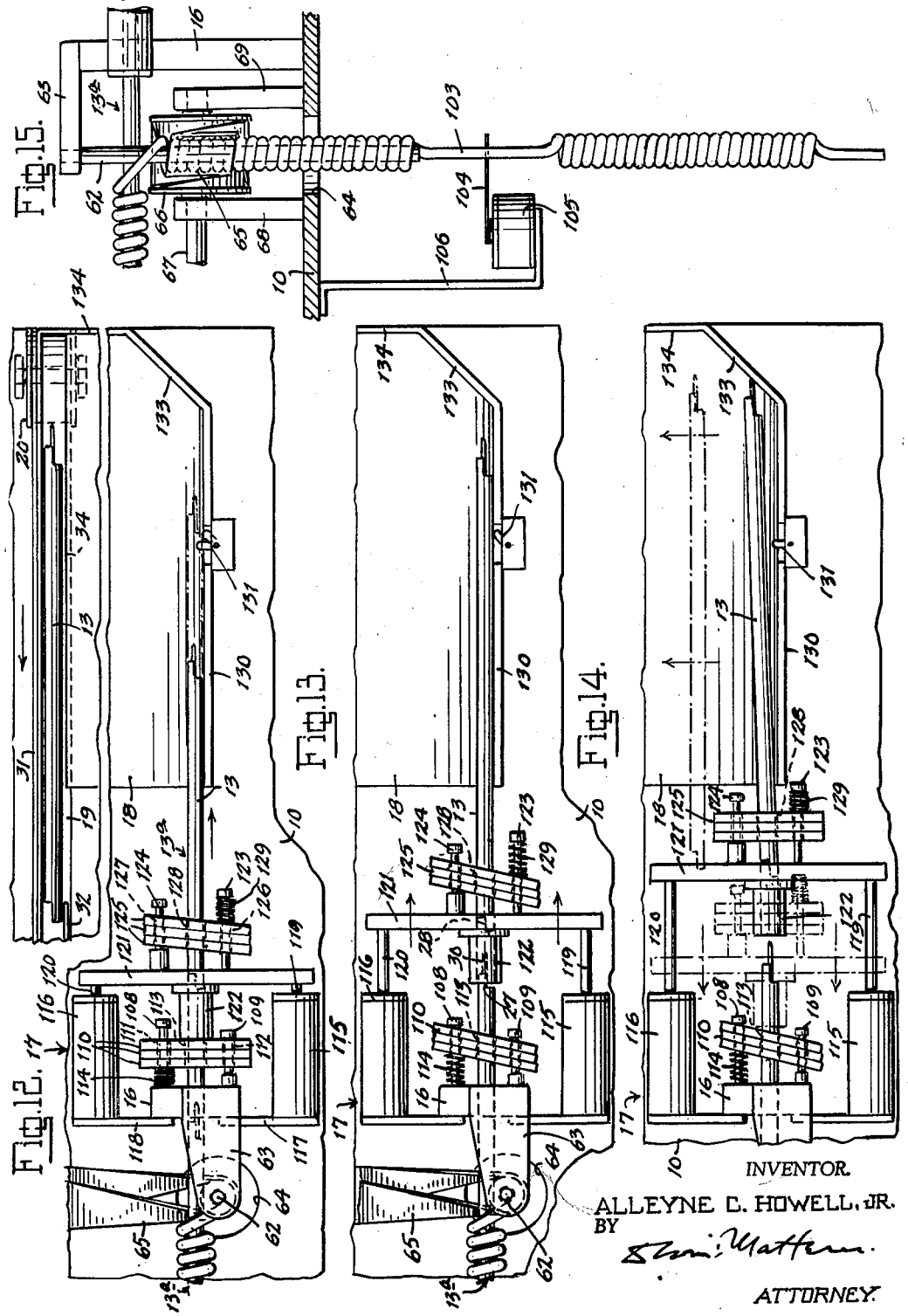

United States Patent Office 3,184,795
Patented May 25, 1965

3,184,795
CONTINUOUS COIL WINDING APPARATUS
Alleyne C. Howell, Jr., 645 Mine Hill Road,
Fairfield, Conn.
Filed Apr. 20, 1962, Ser. No. 189,123
20 Claims. (Cl. 18—19)

The present invention relates to a continuous coil winding apparatus particularly for the production of a strand in the form of a spring or retractile helix. While the invention in its broader concept contemplates a spring or retractile helix of any suitable material and for any desired use it is particularly concerned in its specific aspects with the production of a spring or retractile helix having straight ends, for example as employed as the current conducting connector or extension cord in portable electrical devices such as telephones, electric razors, and the like. Such connectors or extension cords usually comprise a current conducting core, preferably tinsel, having an insulating casing of rubber or suitable synthetic plastic material, for example polyvinyl chloride, which has the capability of becoming permanently set or cured when subjected to heat and subsequent cooling, and which when set or cured in the form of a coil assumes the property of a spring of being elastically extensible and retractible. Retractile cords of this type are well known in the art, and it is also well known to reverse twist the coiled strand after it is set or cured to impart a reverse pitch to the helix which causes the loops of the helix to lie in closer contact with each other and increases the available restoring force.

An object of the present invention is to provide an improved apparatus for the continuous automatic production of a coiled strand, including as a part of the automatic continuous procedure the setting or curing of the coiled strand. A further object is to provide an apparatus whereby predetermined portion of the coiled strand are shielded from the setting or curing procedure, so that such portions do not become permanently set in coil form and, upon removal from the coiling mandrel provide straight sections alternating with coiled sections, the straight sections becoming the straight ends of the individual cord lengths upon severing the cord lengths at intermediate points of the straight sections.

A further object is to provide an apparatus wherein the coiled strand is continuously removed from a continuous mandrel, and further to provide an apparatus whereby the coiled strand is subjected to a reverse twist operation as it is removed from the mandrel.

A further object of the invention is to provide a rigid mandrel adapted to be rotated and longitudinally moved in a straight line and which at the same time is continuous, and to this end it is proposed to provide a mandrel in the form of a plurality of rigid sections having end coupling means, and which sections are adapted to be automatically separated at a point beyond the point of removal of the coiled strand therefrom and returned and reconnected at a point in advance of the point where the strand is coiled thereon.

A further object is to provide an apparatus wherein the mandrel is rotated and longitudinally advanced by means of the strand itself coiled thereon as a helical driving belt, and to this end it is proposed to carry a portion of the strand in coiled relation about the mandrel as a driving belt as the strand is being drawn by a drive pulley or the like from a supply reel, and thereupon feed back the strand from the drive pulley to the mandrel where it is coiled thereon through the helical motion of the rotating and longitudinally advancing mandrel.

Other objects and advantages will become apparent from a consideration of the following detailed description taken in connection with the accompanying drawings wherein a satisfactory embodiment of the invention is shown. However, it will be understood that the invention is not limited to the details disclosed but includes all such variations and modifications as fall within the spirit of the invention and the scope of the appended claims.

In the drawings:

FIG. 1 is a plan view of a strand winding apparatus according to the invention;

FIG. 2 is a side elevation partially broken away;

FIG. 3 is a fragmentary plan view on an enlarged scale of one end of the apparatus showing the delivery end of the return conveyor for the mandrel sections, the feed magazine, and the mandrel engaged by the strand as a driving belt while at the same time a feedback of the strand is coiled thereon;

FIGS. 4, 5 and 6 are plan views similar to FIG. 3 and showing progressive operating positions of the feed means for the mandrel sections, the showing of the delivery end of the conveyor means being omitted in these views;

FIG. 7 is a fragmentary front elevation of the magazine and the delivery end of the conveyor as seen in FIG. 4;

FIG. 8 is a transverse vertical sectional view taken along the line 8—8 of FIG. 7;

FIG. 9 is a fragmentary view showing the part of the apparatus where the coiled strand is subjected to heat to set or cure it, and showing the shielding means in full lines in its operative position at the end of its traverse and in dot-and-dash lines in another operative position at the beginning of its traverse;

FIG. 10 is a plan view of the part of the apparatus as seen in FIG. 9;

FIG. 11 is a transverse sectional view taken along the line 11—11 of FIG. 9;

FIG. 12 is a fragmentary plan view of the part of the apparatus where the coiled strand is removed from the mandrel and has a reverse twist imparted thereto, and also showing the means for separating the mandrel sections as well as the receiving end of the return conveyor for the mandrel sections;

FIG. 13 is a plan view similar to FIG. 12 showing the mandrel section separating means in one operative position, the showing of the receiving end of the conveyor being omitted;

FIG. 14 is a plan view similar to FIG. 13 showing the mandrel section separating means in another operative position, and indicating in dot-and-dash lines the released mandrel section as it moves to the return conveyor;

FIG. 15 is a vertical sectional view showing the means for removing the coiled strand from the mandrel, imparting a reverse twist thereto, and separating the individual cord lengths; and FIG. 16 is a transverse vertical sectional view on an enlarged scale taken along the line 16—16 of FIG. 1, showing the return chute for the mandrel sections.

Referring to the drawings and more particularly to FIGS. 1 and 2 the strand winding apparatus, according to the exemplary embodiment of the invention illustrated therein, comprises an elongated platform 10 supported upon legs 11 and at one end of which there is mounted a magazine 12 for feeding the mandrel sections 13. The magazine is downwardly inclined transversely to the longitudinal axis of the winding mandrel 13a, which comprises a plurality of coupled mandrel sections and is guided longitudinally in a pair of longitudinally spaced bearing supports 14 and 15 adjacent the magazine and in a bearing support 16 adjacent a mandrel separating mechanism 17, from which the separated mandrel sections move upon a downwardly inclined transverse chute 18 to the receiving end of a conveyor belt 19 mounted upon an idler pulley 20 and a driving pulley 21 driven by a motor 22, and which carries the mandrel sections to its delivery end where they are delivered to the magazine 12 as will presently more fully appear.

Intermediate the bearing supports 14 and 15 the mandrel is supported upon a support 23 having a series of blade members 24 which engage the under side of the mandrel and are inclined in correspondence with the pitch of the helically coiled portion of the strand which engages the mandrel to drive it as will presently more fully appear, these blade members being spaced at the desired pitch to act as spacers to space the coils of the strand. At suitable points between the bearing supports 15 and 16, there are also provided suitably spaced mandrel supports 25 each having a single inclined blade 26, and which support the relatively long span of the mandrel between the bearing supports 15 and 16 against sagging and also separate the coils of the strand wound upon the mandrel.

The mandrel sections 13 are in the form of rigid cylindrical rods of suitable length and of a diameter corresponding to the inside diameter of the coil to be wound, and each is provided at its respective ends with a semi-cylindrical notch end 27 and a matching notch end 28, an axial socket 29 extending along the notch end 27 and for a distance into the mandrel and a prong 30 extending axially along the notch end 28 and projecting therefrom, so that the prong end of one mandrel is adapted to be inserted into the socket end of another mandrel with the notch ends inter-engaged to lock the coupled mandrel sections against relative rotation. It is pointed out that the projecting prong 30 is slightly longer than the axial dimension of the notch end 27, so that as the prong end of one section is engaged with the socket end of another section the prong will enter the socket slightly before the outer extremities of the notch ends come together, with the result that the mandrel section being connected is centered within the socket of the preceding rotating and advancing mandrel section. Thus, when longitudinal feeding pressure is applied to the mandrel section being connected its prong end will first be pressed into the socket end of the preceding mandrel section in centralized position, and as further longitudinal pressure is applied the notch ends will inter-engage as rotation of the preceeding section brings its notch end into register with notch end of the mandrel section being connected. Thus the mandrel sections may be disposed in the magazine in random positions although for convenience in illustration they are shown in the drawings as being uniformly positioned.

The conveyor belt (see FIGS. 1-3, 7, 8 and 12) is provided along its upper side with a guideway comprising a pair of laterally spaced guide strips 31 and 32 supported at suitable intervals by hanger brackets 33, the guide strip 31 extending the full length of the upper side of the conveyor and the guide strip 32 terminating at the inner side of the chute member 18 to provide an entrance to enable a separated mandrel section 13 to roll by gravity upon the chute member onto the conveyor belt, the rearward edge of the chute member overlapping the margin of the conveyor belt and having a downwardly turned flange 34 inclined along its lower edge to conform to the inclination of the conveyor belt, as clearly seen in FIGS. 1, 2, 12 and 16, and whereby the mandrel section drops in longitudinally aligned position upon the conveyor belt.

At the delivery end of the conveyor belt its portion disposed about the pulley 21 extends into an opening 35 provided in the inner end wall 36 of the magazine 12, so that its descending surface moves slightly inwardly of the inner surface of the end wall 36 for a purpose presently to more fully appear. At the upper end of the inclined base wall 37 of the magazine there is provided a guide channel 38 of inverted U-shape in cross-section having its inner end open and in substantial alignment with the guideway strip members 31 and 32 at the upper side of the conveyor belt, so that as a mandrel section 13 moves off the delivery end of the conveyor belt, it is guided within the guide channel 38 with its forward end dropping into sliding engagement with the base wall 36 as seen in FIGS. 7 and 8. It thus moves within the guide channel in an inclined position to the point where its rearward end descends with the descending portion of the conveyor belt moving within the opening 35, whereupon it drops from the conveyor belt into a horizontal position at the upper end of the inclined base wall 37, as shown by the dot-and-dash lines in FIG. 7. The inner wall of the guide channel 38 is spaced at its lower edge from the base wall 37 a distance slightly in excess of the diameter of the mandrel section 13 to provide a delivery slot 39 through which the mandrel section, upon assuming its horizontal position clear of the conveyor belt, rolls by gravity to the lower end of the magazine.

An idler pressure roller 40 is mounted in a bracket 41 secured upon the inner end of the guide channel 38 and is normally pressed downwardly by springs 42 to press the mandrel sections into firm contact with the conveyor belt as it moves over the pulley 21, to insure the positive movement of the mandrel sections from the conveyor to the magazine.

In practice there are always provided a plurality of mandrel sections in the magazine and the forward mandrel section is positioned by gravity upon a horizontal guide portion 43 at the lower end of the inclined base wall 37 against a forward stop wall 44 with its ends respectively aligned with an opening 45 in the outer end wall 46 of the magazine and an opening 47 at the lower end of the inner end wall 36, and in which position the forward mandrel section is axially aligned with the mandrel 13a guided in its bearing supports 14, 15 and 16.

An air cylinder 48 is mounted upon the platform 10 and is provided with a plunger 49 axially aligned with the forward mandrel section 13 and adapted to reciprocate through the opening 45 to successively feed and couple the mandrel sections to the rotating axially advancing mandrel 13a. A control switch 50 for the air cylinder is provided in the forward wall 44 of the magazine in position to be engaged and actuated by the forward mandrel section therein. The air cylinder may be air actuated to both project and retract the plunger 49, or it may be air actuated to retract the plunger and spring actuated to project it. In any case the switch 50 is adapted to be depressed by virtue of the engagement therewith of the forward mandrel section to cause the plunger to move in projecting direction, and to be projected when released through disengagement of the forward mandrel section to cause the plunger 49 to be retracted.

As seen in FIG. 3 the forward mandrel section 13 is in coupled relation with the mandrel 13a and has been partially moved out of the magazine through the advancing movement of the mandrel to a point where its rearward end has moved out of engagement with the projected plunger 49, the latter having been in feeding engagement with the mandrel section up to the point where it has reached its full projected position, at which point the coupled mandrel section has moved into driving relation with the mandrel driving means to thus insure positive feeding movement of the coupled mandrel independent of the plunger 49. As the coupled mandrel moves from the position of FIG. 3 to the position of FIG. 4 its rearward end moves past the control switch 50 slightly before such rearward end moves past the next mandrel section in the magazine, so that the switch is released to move to its projected position and thus cause the plunger 49 to be retracted from its projected position as seen in dot-and-dash lines in FIG. 4 to its retracted position as seen in full lines. Thereupon the rearward end of the next adjacent mandrel section drops into alignment with the plunger.

As the forward mandrel section continues to advance it moves from the position of FIG. 4 to the position of FIG. 5 clear of the next adjacent mandrel section so that the latter then drops from the oblique position as seen in FIG. 4 to the axially aligned position as seen in FIG. 5 wherein it engages and depresses the control switch 50 to cause the plunger 49 to be projected. As the plunger is projected it presses the forward mandrel section axially toward the mandrel and forces its prong end into the socket end of the preceding mandrel section as seen in FIG. 6, in which position it continues its forward movement under the pressure of the plunger to the point where it is in driving relation with the mandrel driving means whereupon it advances with the advancing movement of the mandrel as seen in FIG. 3.

As previously pointed out the prong and socket arrangement is such that as a mandrel section drops into axially aligned feeding position it becomes centered with respect to the preceding mandrel through an initial engagement of its prong in the socket of the preceding mandrel section, and thereupon as forward feed pressure of the plunger 49 is continued upon the mandrel section being coupled the notch ends of the two mandrels are pressed into end engagement and interlock as soon as the relative rotation of the mandrel brings them into register.

The strand S to be coiled is supplied from a reel 51 removably mounted in bearing supports 52 upon a platform extension 53 of the platform 10, and is carried about conventional guide rollers 54 and a tension roller 55 to the mandrel 13a where it is helically coiled between the bearing supports 14 and 15 to provide a mandrel driving belt, as indicated at 56, and from which it is carried over a guide roller 57 and about a pulley 58 mounted upon the output shaft 59 of a gear reducer 60 driven by a drive motor 61. The mandrel is thus helically rotated and advanced longitudinally. From the pulley 58 a feedback of the strand is carried to the mandrel at a point adjacent to the bearing support 15 and is coiled upon the mandrel through its rotation and longitudinal advance. The coils of the drive belt portion 56 of the strand are separated by the spacer blade members 24 of the mandrel support 23, and the coils of the strand being wound upon the mandrel are separated by the spacer blade members 26 of the spaced mandrel supports 25.

At the start of the winding operation, i.e., when a new reel of strand material is placed in the apparatus, the end of the strand is first carried about the guide and tension rollers 54 and 55, is coiled about the mandrel to provide the driving belt 56, and is carried over the guide rollers 57 and about the pulley 58 back to the mandrel where the end is temporarily fastened as by taping. Thereupon the apparatus is operated to wind the strand upon the mandrel from the receiving point adjacent the bearing support 15 to the take-off point adjacent the bearing support 16. At the take-off point the end of the strand is unfastened from the mandrel and is coiled about a stationary stub mandrel 62 vertically disposed in forwardly spaced relation to the mandrel 13a and supported at its upper end by a bracket 63 secured to the bearing support 16.

As clearly shown in FIGS. 12 and 15 the strand at the take-off point is coiled about the stub mandrel 62 with a reverse twist which reverses the pitch of the coil disposed about the stub mandrel, and which reverse pitch coil is helically rotated and advanced downwardly upon the stub mandrel at a speed corresponding to the helical movement of the mandrel 13a and the coil wound about it. The stub mandrel and the reverse pitch coil moving downwardly thereon are extended through an opening 64 in the platform 10. The reverse pitch coil upon the stub mandrel is helically rotated by a belt 65 having a right angle twist therein and driven by a pulley 66 mounted upon one end of a horizontal shaft 67 supported at each side of the pulley in bearing supports 68 and 69.

The other end of the shaft 67 is supported in a bearing support 70 and is provided with a pulley 71 engaged by a driving belt 72 extending about a pulley 73 mounted upon one end of a feed screw 74 supported upon bearing supports 75 and 76, and provided at its other end with a pulley 77 engaged by a driving belt 78 carried over guide rollers 79 to a pulley 80 provided upon the output shaft 59 of the gear reducer 60. It is pointed out that the diameters of the pulley 66 and the reverse pitch coil moving upon the stub mandrel 62 are such in relation to the width of the belt 65 that the driving portion of the belt engaged about the reverse pitch coil is disposed at an angle corresponding to the pitch of the coil. The belt embraces the first take-off coil from the mandrel 13a as well as a sufficient number of additional coils to impart a positive helical drive to the reverse pitch coil to move it downwardly upon the stub mandrel at the same coiling speed as the mandrel 13a, so that the take-off speed of the strand at the take-off point is the same as its coiling speed at the receiving point of the mandrel, and consequently the coils are at all times under an even tension to maintain them in a uniformly tight relation about the mandrel.

As the coiled strand moves longitudinally with the mandrel 13a, and beginning at a point spaced from the receiving point of the coil upon the mandrel for a purpose presently to more fully appear, it is first subjected to a curing step, accomplished for example by the radiation heating of an infra-red heat lamp 81. This is illustrated above the coil, but it may be arranged below, at the sides, or in completely surrounding relation to the coil, depending upon the particular curing requirements of the strand material. While an infra-red heat lamp is illustrated, obviously other known heating means and procedures may be employed, such as a hot bath or a spray of liquid, an example of the latter being the liquid heating method employing silicone mold release compound.

As the coil moves out of relation with the heating means it is successively moved into relation with a cooling means to set it, and a drying means. These are shown for example as a water cooling spray unit 82 and an air drying unit 83 disposed above the coil, although it will be understood that other known cooling and drying means and procedures may be employed in any suitable relation to the coil.

In order to provide the retracticle cord with straight ends for connection to electrical devices, the coil upon the mandrel 13a is protected along equally spaced sections from the curing effect of the heating unit 81, the protected sections when straightened providing straight connections alternating with the permanently coiled sections. The straight connections are of such length that upon being severed at their mid-points they provide the straight ends of individual retractile cords.

Referring particularly to FIGS. 1, 2, 9, 10 and 11, the means for such purpose comprises a pair of longitudinally spaced tubular sheath members 84 and 85 surrounding the coil upon the mandrel and mounted upon the ends of an arm 86 secured to a slide carrier 87 slideably mounted upon a guide bar 88 secured at its ends upon the bearing supports 75 and 76 in opposed relation to the feed screw 74. A solenoid 89 is mounted upon one side of the slide carrier and its armature 90 is provided with a tooth 91 which in the projected position engages with the feed screw 74 and in its retracted position is free of the feed screw. A switch 92 mounted upon the under side of the slide carrier is connected by an electrical connection 93 to the solenoid to control it. At the end of the forward traverse of the slide carrier the switch is adapted, as een in full lines in FIGS. 9 and 10, to engage an actuating member 94 to cause the armature to be retracted to release the carrier from the feed screw, and is adapted upon return of the carrier to its starting position, as indicated by the dot-and-dash lines, to engage an actuating member 95 to cause the solenoid to be projected to engage its tooth 91 with the feed screw to propel the slide carrier in its forward traverse.

In order to impart instantaneous return movement to the slide carrier upon its release from the feed screw, a cable 96 connected at one end to a post 97 provided upon the slide carrier and at its other end to a weight 98, is guided over a pulley 99 mounted in a bracket 100 secured to the bearing support 75, so that the weight is suspended from the pulley to move vertically through an opening 101 in the platform 10. A stop member 102, preferably of rubber, is provided upon the upper side of the slide bar 88 against which the slide carrier engages at the end of its return movement, as shown by dot-and-dash lines FIG. 10.

The rate of rotation and the pitch of the feed screw are such that the speed of the forward traverse of the slide carrier corresponds to the forward speed of the mandrel 13a, so that during such forward traverse the protective sheaths 84 and 85 move with the sections of the coil protected thereby. At the beginning of the forward traverse, indicated by the dot-and-dash lines in FIGS. 9 and 10, the sheath member 84 is disposed about the section of the coiled strand immediately adjacent the receiving point of the strand upon the mandrel and offset from the heating unit 81. At the end of the forward traverse, as indicated by the full lines, the sheath 84 has moved to an intermediate point of the heating unit and the sheath 85 has moved beyond it. At this point the slide carrier is released from the feed screw through engagement of the switch 92 with the actuating member 94, and is instantaneously returned by the weight 98 to the starting position, so that as the sheath 84 moves into relation with a new coil section at the starting position the sheath 85 moves into relation with the section of the coil previously protected by the sheath 84, and, while this latter section is momentarily exposed to the heating unit, the exposure is insufficient to effect any curing action. As soon as the slide carrier is returned to the starting point, indicated by the dot-and-dash lines FIGS. 9 and 10, the switch 92 is actuated by the actuating member 95 to project the armature 90 and engage its tooth 91 with the feed screw 92, whereupon the slide carrier starts its forward traverse.

As the reverse twist coil moves downwardly off of the end of the stub mandrel 62 the uncured coils that have been protected by the sheath members assume a straight vertical position, as indicated at 103 in FIG. 15, and at this point the knife blade 104 of a rotary solenoid 105 mounted upon a bracket 106 is actuated to sever the straight section 103 at its mid-point and thus separate a retractile cord length having straight ends. The solenoid 105 is preferably actuated in timed relation with each operating cycle of the slide carrier 87, and to this end an electrical connection 107, FIG. 2, extends from the switch 92 to the solenoid 105 to actuate the latter upon each actuation of the switch to retract the solenoid 89. This results in an accurate uniform severing of the retractile cord lengths, as each operative cycle of the slide carrier 87 represents an advance of the coil corresponding to a cord length.

As each mandrel section 13 of the mandrel 13a is advanced beyond the bearing support 16 it is automatically separated from the mandrel and returned to the mandrel magaazine 12. Upon the bearing support 16 there are secured at the sides of the mandrel passages horizontal headed pins 108 and 109 which loosely support a plurality of gripper plates 110, each having apertures 111 and 112 engaged by the respective pins and a central aperture 113 through which the mandrel passes. In the position of the gripper plates parallel to a plane normal to the axis of the mandrel the central aperture 113 is free of the mandrel to allow its free passage, while in a tilted position the edges of the apertures 113 have gripping engagement with the mandrel. A helical spring 114 engaged upon the pin 108 between the bearing support 16 and the gripper plates biases the plates into a tilted position.

A pair of air cylinders 115 and 116, supported by brackets 117 and 118 upon the bearing support 16, are disposed at the sides of the gripper plates 110, and their plungers 119 and 120 are connected by a cross-bar 121 provided centrally with a sleeve 122 through which the mandrel passes. In the retracted position of the cross-bar, as seen in FIG. 12, the sleeve 122 presses the gripper plates 110 against the pressure of the spring 114 into their untilted non-gripping position, so that in this retracted position the mandrel moves freely through the gripper plates and the sleeve 122. On the opposite side of the cross-bar from the sleeve 122 there are secured pins 123 and 124 on which there are loosely supported a plurality of gripper plates 125, similar to the plates 110, each having apertures 126 and 127 engaged by the respective pins and a central aperture 128 through which the mandrel passes. A helical spring 129 engaged upon the pin 123 between its head and the gripper plates biases the plates into tilted gripping position.

In operation the mandrel moves through the gripper plates 110 and 125 as seen in FIG. 12, passing freely through the non-tilted plates 110, and its helical rotating and advancing movement propelling it through the tilted gripping plates 125. In this latter respect the advancing mandrel causes the gripper plates 125 to tilt slightly away from their fully tilted position against the pressure of the spring 129, which is sufficiently light to permit this. As the forward mandrel section moves into relation with the chute 18 it is disposed in parallel sliding relation with the forward wall 130 of the chute, and as its forward end moves from the full line position of FIG. 12 to the dot-and-dash line position it engages a control switch 131 mounted upon the wall 130 and connected by an electrical connector 132, FIGS. 1 and 2, to the air cylinders 115 and 116. This engagement moves the switch from its normally projected position shown in full lines to the depressed position indicated by the dot-and-dash lines to cause the air cylinders to be actuated to project the cross-bar 121 as seen in FIG. 13. At this point the joint between the forward mandrel section and the adjacent mandrel section is disposed at a point in advance of the gripper plates 110, as shown by the dot-and-dash lines in FIG. 12 and the full lines in FIG. 13, so that as the cross-bar 121 is projected the forward mandrel section is gripped by the gripper plates 125 and separated from the adjacent mandrel section, the latter in the meantime being restrained against separation from the mandrel by the gripper plates 110 which assume their tilted gripping position as seen in FIG. 13 upon disengagement of the sleeve 122 of the cross-bar therefrom, it being pointed out that while this gripping engagement is sufficient to restrain the mandrel section against forward movement with the mandrel section being separated it permits the continued rotation and advance of the mandrel so that there is no interruption in its continuity of movement. As the cross-bar reaches its fully projected position the forward end of the forward mandrel section 13 being separated thereby engages an inclined cam wall 133, disposed in its longitudinal path, and diverts it to a diagonal position as seen in FIG. 14 out of engagement with the switch allowing the latter to resume its projected position. This causes the air cylinders to be actuated to retract the cross-bar 121 and the gripper plates 125, the latter assuming a non-tilted position against the force of the spring 129, so that as the cross-bar moves to its retracted position, as seen by the dot-and-dash lines in FIG. 14, the gripper plates 125 move free of the separated forward mandrel section which thereupon rolls down the chute to the return conveyor, the cross-bar 121 finally moving from the dot-and-dash line position of FIG. 14 to the fully retracted full line position as seen in FIG. 12.

An end wall 134 is provided along the transverse outer edge of the chute and extends from the inclined cam wall 133 across the end of the conveyor as shown in FIG. 16 to insure retention of the mandrel sections upon the chute as they move to the conveyor belt 19 which returns them to the mandrel magazine 12.

What is claimed is:

1. Apparatus for coil winding a strand, comprising an elongated mandrel, bearing supports for said mandrel supporting it for helical rotary and longitudinal movement respectively about and parallel to its axis, a strand to be coiled, strand supply means from which said strand extends in helically coiled relation about and from said mandrel to constitute a helical driving belt to impart helical rotary and longitudinal movement to said mandrel, means for guiding said strand from said driving belt back to said mandrel at a receiving point longitudinally in advance of said driving belt for coiling thereon through the helical rotary and longitudinal movement of said mandrel, and means for taking said coiled strand from said mandrel at a point longitudinally in advance of its receiving point thereon.

2. The invention as defined in claim 1, further characterized by spacer means for separating the coils of said driving belt.

3. The invention as defined in claim 1, further characterized by spacer means for separating the coils of said coiled strand fed back upon said mandrel.

4. Apparatus for coil winding a strand, comprising an elongated mandrel, bearing supports for said mandrel supporting it for helical rotary and longitudinal movement respectively about and parallel to its axis, a strand to be coiled, strand supply means from which said strand extends in helically coiled relation about and from said mandrel to constitute a helical driving belt to impart helical rotary and longitudinal movement to said mandrel, driving means for drawing said strand from said driving belt and feeding it back to said mandrel at a receiving point longitudinally in advance of said driving belt for coiling thereon through the helical rotary and longitudinal movement of said mandrel, and means for taking said coiled strand from said mandrel at a point longitudinally in advance of its receiving point thereon.

5. Apparatus for coil winding a strand, comprising an elongated mandrel, bearing supports for said mandrel supporting it for helical rotary and longitudinal movement respectively about and parallel to its axis, a strand to be coiled, strand supply means from which said strand extends in helically coiled relation about and from said mandrel to constitute a helical driving belt to impart helical rotary and longitudinal movement to said mandrel, means for guiding said strand from said driving belt back to said mandrel at a receiving point longitudinally in advance of said driving belt for coiling thereon through the helical rotary and longitudinal movement of said mandrel, a fixed stub mandrel disposed in offset relation to said first mentioned mandrel upon which said coiled strand is taken therefrom at a point longitudinally in advance of its receiving point thereon, and driving means engaged with said coiled strand upon said stub mandrel and disposed at an angle corresponding to the pitch of said coiled strand to impart helical rotary and longitudinal movement thereto in a direction away from said first mentioned mandrel.

6. The invention as defined in claim 5 wherein said strand is reverse twisted in its transition from said first mentioned mandrel to said stub mandrel.

7. The invention as defined in claim 5, wherein said first mentioned mandrel is horizontal and said stub mandrel is vertical and has a downwardly disposed free end.

8. Apparatus for coil winding a strand embodying curable material subject to substantially permanent setting in an elastic state, comprising an elongated mandrel, bearing supports for said mandrel supporting it for helical rotary and longitudinal movement respectively about and parallel to its axis, a strand to be coiled, strand supply means from which said strand extends in helically coiled relation about and from said mandrel to constitute a helical driving belt to impart helical rotary and longitudinal movement to said mandrel, means for guiding said strand from said driving belt back to said mandrel at a receiving point longitudinally in advance of said driving belt for coiling thereon through the helical rotary and longitudinal movement of said mandrel, means for taking said coiled strand from said mandrel at a point longitudinally in advance of its receiving point thereon, and means for subjecting said coiled strand to a curing medium between its receiving and take-off points.

9. In an apparatus for coil winding a strand embodying curable material subject to substantially permanent setting in an elastic state, an elongated mandrel, bearing supports for said mandrel supporting it for helical rotary and longitudinal movement substantially about and parallel to its axis, means for rotating and moving the mandrel in a longitudinal direction, means for feeding a strand to said mandrel to be coiled thereon, means for taking said coiled strand from said mandrel at a point longitudinally in advance of its receiving point thereon, and means for subjecting said coiled strand between its receiving and take-off points to a curing medium.

10. In an apparatus for coil winding a strand embodying curable material subject to substantially permanent setting in an elastic state, an elongated mandrel, bearing supports for said mandrel supporting it for helical rotary and longitudinal movement respectively about and parallel to its axis, means for rotating and moving the mandrel in a longitudinal direction, means for feeding a strand to said mandrel to be coiled thereon, means for taking said coiled strand from said mandrel at a point longitudinally in advance of its receiving point thereon, and successively arranged means for subjecting said coiled strand between its receiving and take-off points to heat and to cold to cure and set it.

11. In an apparatus for coil winding a strand embodying curable material subject to substantially permanent setting in an elastic state, an elongated mandrel, bearing supports for said mandrel supporting it for helical rotary and longitudinal movement respectively about and parallel to its axis, means for rotating and moving the mandrel in a longitudinal direction, means for feeding a strand to said mandrel to be coiled thereon, means for taking said coiled strand from said mandrel at a point longitudinally in advance of its receiving point thereon, and successively arranged means for subjecting said strand coiled upon said mandrel to heat and to a cooling medium to cure and set it, and to a drying medium to dry it.

12. In a apparatus for coil winding a strand embodying curable material subject to substantially permanent setting in an elastic state, an elongated mandrel, bearing supports for said mandrel supporting it for helical rotary and longitudinal movement respectively about and parallel to its axis, means for rotating and moving the mandrel in a longitudinal direction, means for feeding a strand to said mandrel to be coiled thereon, means for taking said coiled strand from said mandrel at a point longitudinally removed from its receiving point thereon, means for subjecting said coiled strand between its receiving and take-off points to a curing medium, and shielding means adapted to be disposed in relation to a portion of said coil upon said mandrel to shield it from said curing medium.

13. In an apparatus for coil winding a strand embodying curable material subject to substantially permanent setting in an elastic state, an elongated mandrel, bearing supports for said mandrel supporting it for helical rotary and longitudinal movement respectively about and parallel to its axis, means for rotating and moving the mandrel in a longitudinal direction, means for feeding a strand to said mandrel to be coiled thereon, means for taking said coiled strand from said mandrel at a point longitudinally in advance of its receiving point thereon, means for subjecting said strand coiled upon said mandrel to a curing medium, shielding means adapted to be disposed in relation to a portion of said coil upon said mandrel to shield it from said curing medium, and means for moving said shielding means longitudinally with the longitudinal movement of said mandrel.

14. In an apparatus for coil winding a strand embodying curable material subject to substantially permanent setting in an elastic state, an elongated mandrel, bearing supports for said mandrel supporting it for helical rotary and longitudinal movement respectively about and parallel to its axis, means for rotating and moving the mandrel in a longitudinal direction, means for feeding a strand to said mandrel to be coiled thereon, means for taking said coiled strand from said mandrel at a point longitudinally in advance of its receiving point thereon, means for subjecting said strand coiled upon said mandrel to a curing medium, shielding means adapted to be disposed in relation to a portion of said coil upon said mandrel to shield it from said curing medium, reciprocating means for imparting movement to said shielding means, means for moving said reciprocating means longitudinally with the longitudinal movement of said mandrel, and means for imparting rapid return movement of said reciprocating means.

15. In an apparatus for coil winding a strand embodying curable material subject to substantially permanent setting in an elastic state, an elongated mandrel, bearing supports for said mandrel supporting it for helical rotary and longitudinal movement respectively about and parallel to its axis, means for rotating and moving the mandrel in a longitudinal direction, means for feeding a strand to said mandrel to be coiled thereon, means for taking said coiled strand from said mandrel at a point longitudinally in advance of its receiving point thereon, means for subjecting said coiled strand between its receiving and take-off points upon said mandrel to a curing medium, a pair of longitudinally spaced shielding means adapted to be disposed in relation to portions of said coil upon said mandrel to shield them from said curing medium, reciprocating means for imparting movement to said shielding means, means for moving said reciprocating means longitudinally with the longitudinal movement of said mandrel a distance corresponding to the spacing of said shielding means, and means for imparting rapid return movement to said reciprocating means.

16. In an apparatus for coil winding a strand embodying curable material subject to substantially permanent setting in an elastic state, an elongated horizontal mandrel, bearing supports for said mandrel supporting it for helical rotary and longitudinal movement respectively about and parallel to its axis, means for rotating and moving the mandrel in a longitudinal direction, means for feeding a strand to said mandrel to be coiled thereon, means for taking said coiled strand from said mandrel at a point longitudinally in advance of its receiving point thereon, means for subjecting said strand coiled upon said mandrel to a curing medium, shielding means adapted to be disposed in relation to a portion of said coil upon said mandrel to shield it from said curing medium, a vertical stub mandrel disposed in offset relation to said first mentioned mandrel upon which said coiled strand is taken therefrom and having a downwardly disposed free end, and strand severing means for severing the uncured portions of said strand as they move below the free end of said stub mandrel.

17. In an apparatus for coil winding a strand, an elongated mandrel comprising a plurality of mandrel sections, joint means at the respective ends of said mandrel sections for longitudinal engaging and disengaging movement one with another, bearing supports for said mandrel supporting it for helical rotary and longitudinal movement respectively about and parallel to its axis, means for rotating and moving the mandrel in a longitudinal direction, means for feeding a strand to said mandrel to be coiled thereon, means for taking said coiled strand from said mandrel at a point longitudinally in advance of its receiving point thereon, separating means for individually and successively separating said mandrel sections as each is at the forward end of said mandrel in advance of the take-off point of said strand, conveyor means movable in the opposite direction from the longitudinal direction of movement of said mandrel for conveying said separated mandrel sections, magazine means for receiving said mandrel sections from said conveyor means and for individually and successively disposing said mandrel sections in axial line with the rearward end of said mandrel, and feeding means for individually and successively feeding said axially aligned mandrel sections into joined relation with the rearward end of said mandrel.

18. The invention as defined in claim 17, further characterized by means arranged to be actuated by the forward mandrel section of said mandrel at a predetermined point in its advance to actuate said separating means.

19. The invention as defined in claim 17, further characterized by means arranged to be actuated by the rearward mandrel section of said mandrel at a predetermined point in its advance to actuate said feeding means.

20. The invention as defined in claim 17, further characterized by means arranged to be actuated by the forward mandrel section of said mandrel at a predetermined point in its advance to actuate said separating means, and means arranged to be actuated by the rearward mandrel section of said mandrel at a predetermined point in its advance to actuate said feeding means.

References Cited by the Examiner
UNITED STATES PATENTS

| | | | |
|---|---|---|---|
| 2,412,187 | 12/46 | Wiley | 264—289 |
| 2,547,356 | 4/51 | Ames | 18—19 |
| 2,547,357 | 4/51 | Cox | 18—19 |
| 2,560,855 | 7/51 | Flanagan | 18—1 |
| 2,575,747 | 11/51 | Cook | 18—19 |
| 2,618,812 | 11/52 | Hulswit et al. | 264—327 |
| 2,920,351 | 1/60 | Hardesty et al. | 18—56 |
| 3,054,149 | 9/62 | Streicher | 18—56 |

MICHAEL V. BRINDISI, *Primary Examiner.*

MORRIS LIEBMAN, ROBERT F. WHITE, *Examiners.*